United States Patent [19]

Nakamura

[11] Patent Number: 5,930,365
[45] Date of Patent: Jul. 27, 1999

[54] DIGITAL DATA SHUFFLING/DE-SHUFFLING SYSTEM

[76] Inventor: Takaaki Nakamura, 13-13, Shakujiidai 1-chome Nerima-ku, Tokyo 177, Japan

[21] Appl. No.: 08/839,684

[22] Filed: Apr. 14, 1997

[30] Foreign Application Priority Data

Jul. 19, 1996 [JP] Japan .................................. 8-207660

[51] Int. Cl.$^6$ ...................................................... H04L 9/00
[52] U.S. Cl. .................................. 380/28; 380/9; 380/29; 380/33; 380/37; 380/49; 380/59
[58] Field of Search .................... 380/9, 28, 29, 380/33, 34, 37, 49, 50, 59

[56] References Cited

U.S. PATENT DOCUMENTS

| | | |
|---|---|---|
| 2,055,702 | 9/1936 | Patton ........................................ 380/49 |
| 2,425,006 | 2/1947 | Rosen ........................................ 380/9 |
| 5,231,662 | 7/1993 | Van Rumpt et al. ....................... 380/9 |

*Primary Examiner*—Bernarr E. Gregory
*Attorney, Agent, or Firm*—Dellett and Walters

[57] ABSTRACT

The invention provides a digital data shuffling/de-shuffling system so that information data is not understood or deciphered by unauthorized third party. Included are a system for generating plural bits of digital data to be transmitted, a circuit network 7 having a plurality of input terminals #1 through #8 and output terminals #11 through #18 equal to the number of bits to be transmitted and a plurality of switching circuits S for selectively cross connecting or non-cross connecting between two lines out of a plurality of transmission lines $a_1$ through $a_8$ interconnecting the corresponding input and output terminals, and a control circuit P for controlling the plurality of switching circuits S. The control circuit P is controlled to shuffle the data applied to the input terminals #1 through #8 for providing the shuffled output from the output terminals #11 through #18.

2 Claims, 5 Drawing Sheets

DIGITAL DATA SHUFFLING/DE-SHUFFLING SYSTEM

FIELD OF INVENTION

The present invention relates to a digital data transmission system, more specifically to digital data shuffling/de-shuffling system for shuffling and de-shuffling the digital data by a "lottery" technique so that the digital data is not understood by an un-authorized third party.

BACKGROUND OF THE INVENTION

PRIOR ART

It is well known to digitize an analog signal by PCM (pulse coded modulation) at the transmission end and to reproduce the original analog signal by receiving the digitized PCM signal at the receiving end.

As shown in FIG. 7, at the transmission end, there are provided a sampling circuit 1 by sampling the analog signal to be transmitted in response to sampling pulses to provide a PAM pulse in proportion to the amplitude of the input signal waveform, a quantization circuit 2 to quantize the amplitude of the PAM pulse into $2^7(=128)$ to $2^8(=256)$ steps in accordance with a predetermined rule, and an each step coding circuit (PCM pulse coding) 3 for converting each step into combinations of presence or absence of unit pulses comprising 7 bits or 8 bits binary code.

Now, shown in FIG. 8 is the PCM pulse coding steps. However, the PCM pulse as shown in FIG. 8 is represented by $2^4(=16)$ steps as an example.

Amplitude value of the stepped PCM pulse is now represented by decimal "105". This is equal in binary to $1\times2^6+1\times2^5+0\times2^4+1\times2^3+0\times2^2+0\times2^1+1\times2^0$, or "1101001". This means that the amplitude is represented by presence ("1") or absence ("0") of 7 unit pulses. Such PCM coded pulse signal is transmitted to the receiving end through a transmission path 4.

On the other hand, reverse operations to the transmission end are performed at the receiving end. Firstly, the pulse signal coded into PCM pulse is decoded by a decoding circuit 5 to obtain a PAM pulse which is reproduced to the analog signal through a filter circuit 6 for removing quantization noise.

PROBLEM TO BE SOLVED BY THE INVENTION

In the digital data transmission system such as the conventional PCM signal to notify to the receiving end presence or absence of unit pulses of weighted binary number, it is required to know in advance the location of each digit during the receiving operation at the receiving end. As a result, in such digital data transmission system, such information data is easily understood by a third party if the weighting of each digit is known.

SUMMARY OF THE INVENTION

It is therefore an object of the present invention to provide a digital data shuffling/de-shuffling system so that the information data is not easily understood or deciphered by a third party, thereby maintaining data confidentiality.

MEANS TO SOLVE THE PROBLEM

In order to solve such problem, the digital data shuffling/de-shuffling system according to the present invention comprises means for generating plural bits of digital data to be transmitted, a circuit network having a plurality of input and output terminals equal to the number of the bits and a plurality of switching circuits for selectively cross connecting or non-cross connecting between two lines out of a plurality of transmission lines from the input terminals to the output terminals, and a control circuit for controlling the plurality of switching circuits. The control circuit controls the switching circuits to shuffle the data applied to the input terminals so as to obtain the output data from the output terminals.

On the other hand, the digital data de-shuffling system according to the present invention comprises a circuit network having a plurality of input and output terminals equal to the number of bits of the shuffled digital data and a plurality of switching circuits for selectively cross connecting or non-cross connecting two lines out of a plurality of transmission lines from the input terminals to the output terminals, and a control circuit for controlling the plurality of switching circuits. The shuffled digital data applied to the input terminals is de-shuffled to derive the original digital data from the output terminals.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DETAILED DESCRIPTION OF THE INVENTION (Embodiment)

Figure 6:
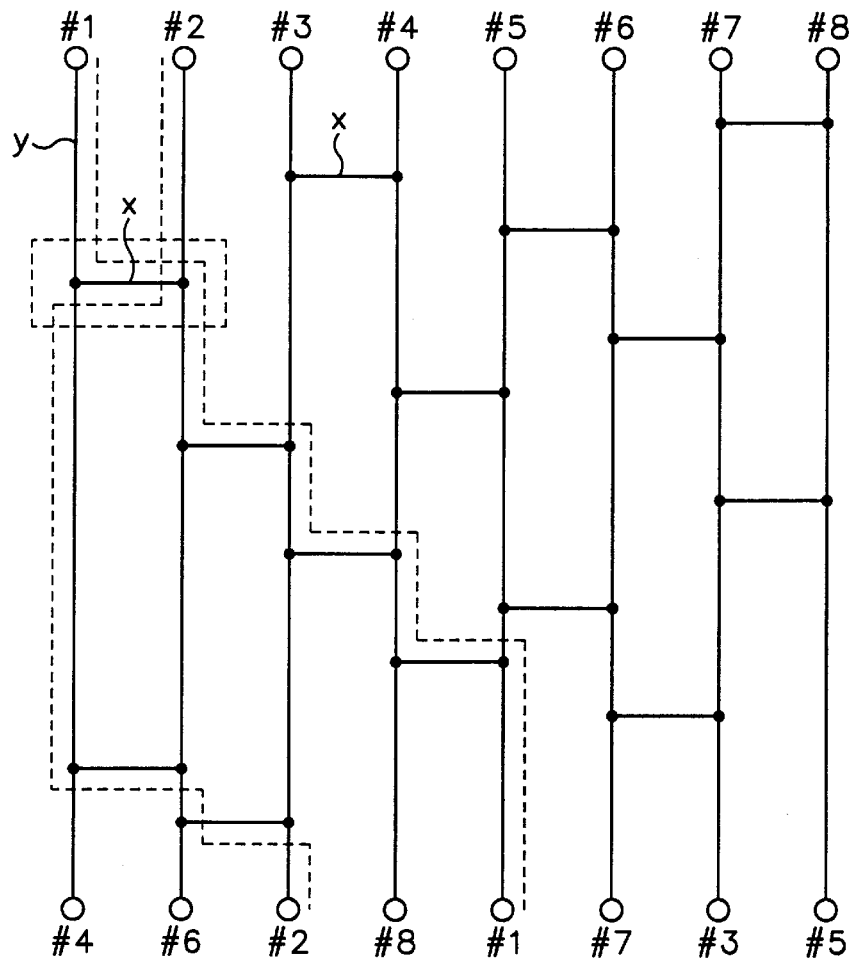
FIG. 6 is an explanation of the "lottery" technique used herein.
Figure 8:
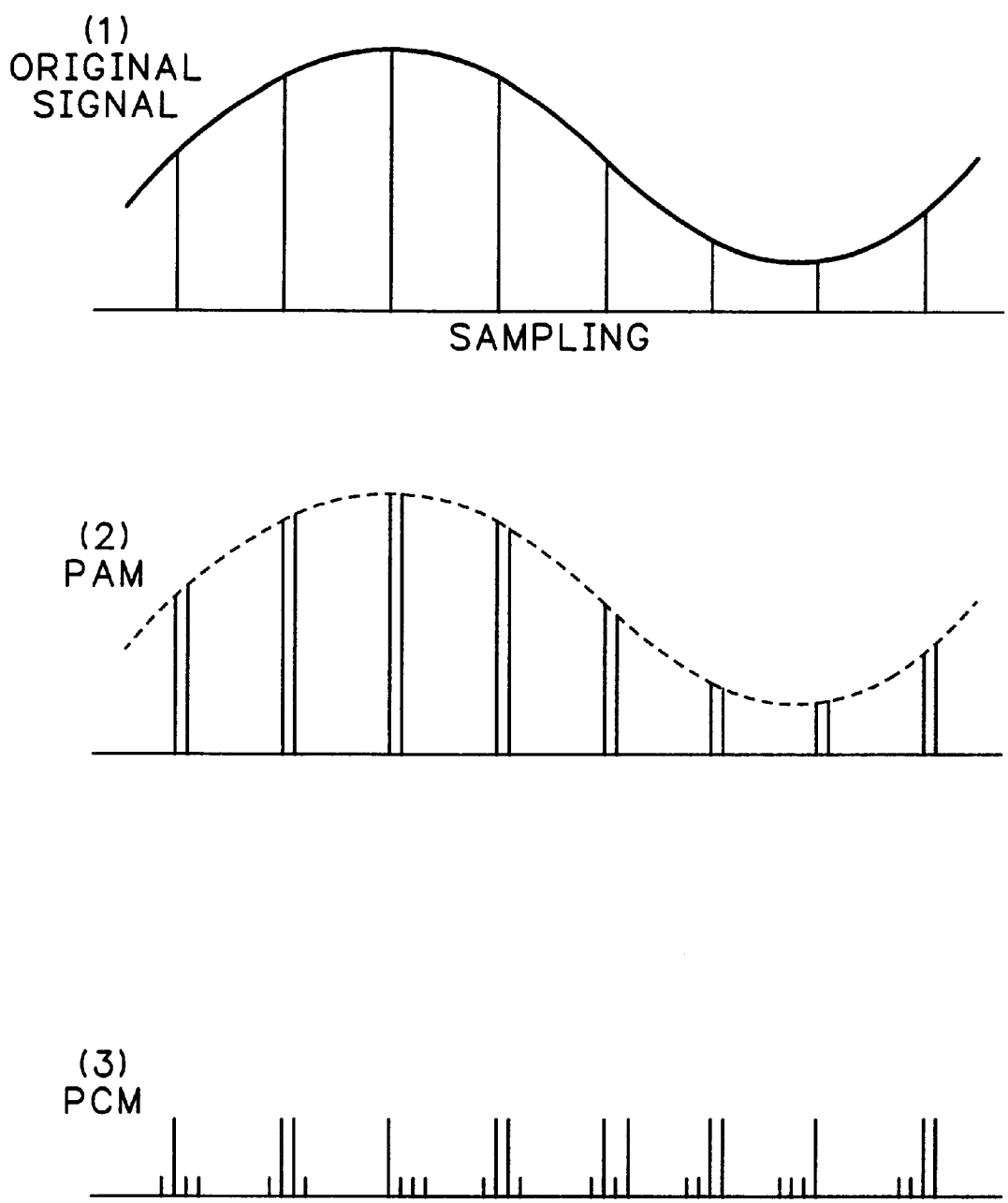
FIG. 8 is waveforms to describe the conventional PCM pulse coding processes.

The "lottery" technique in this specification comprises as shown in FIG. 6 a plurality of vertical lines tied to starting points (#1 through #8) and a plurality of cross bars x crossing between any desired adjacent vertical lines at any desired locations. Move down along the vertical lines y and shift to the adjacent lines y along the cross bars x when reaching the junction points. This is repeated until reaching the final destinations. This is the rule of the "lottery". As a result, the starting points (#1 through #8) and the final destinations (#4, #6, #2, #8, #1, #7, #3, #5) vary depending on the number and locations of the cross bars x, thereby shuffling. This is often used in drawing lots.

The present invention is the digital data shuffling/de-shuffling system to utilize the "lottery" technique. Now, an embodiment of the present invention will be described in detail by reference to the accompanying drawings.

Figure 1:
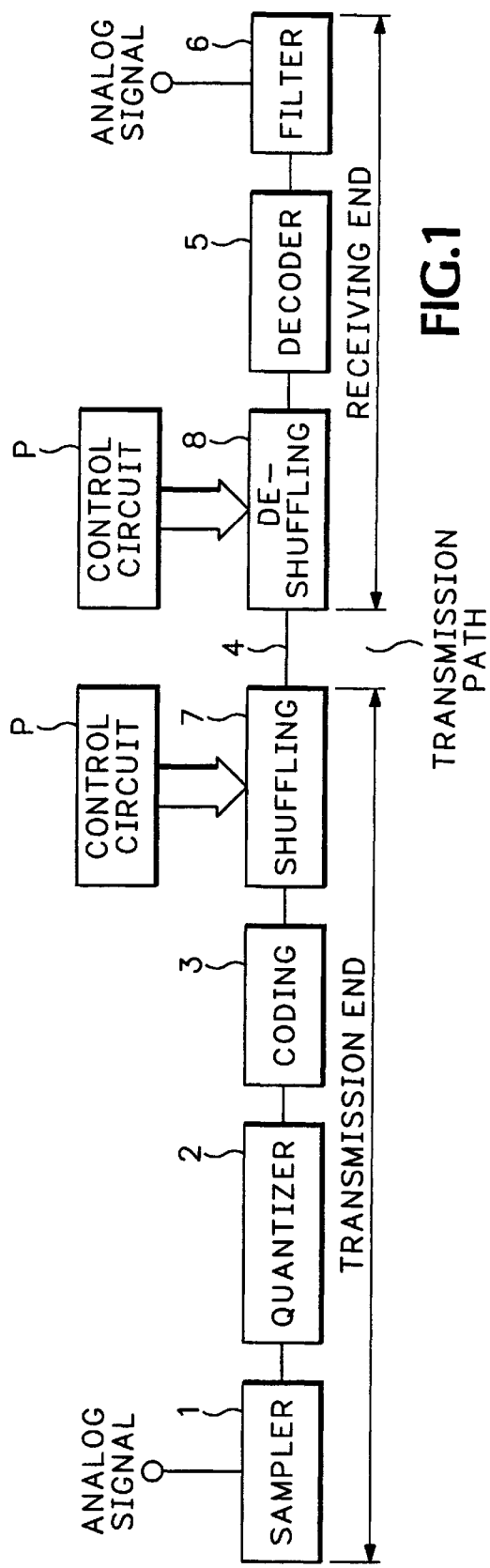
FIG. 1 is a block diagram of the digital data shuffling/de-shuffling system according to the present invention.
Figure 7:
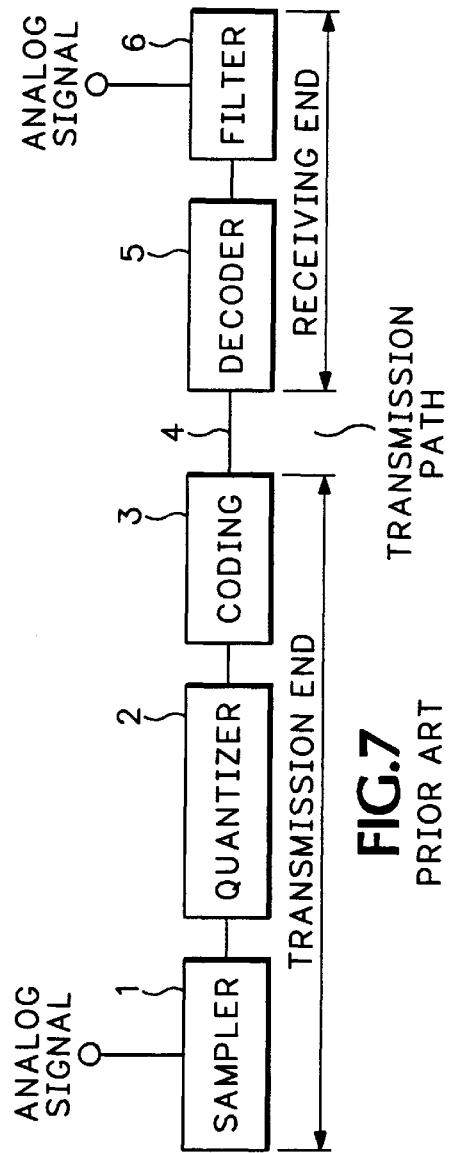
FIG. 7 is a block diagram of a conventional PCM data transmission system.

As best shown in FIG. 1, a transmission end comprises a sampling circuit 1 to sample the analog signal to be transmitted in response to sampling pulses to obtain a PAM pulse in proportion to the amplitude of the analog input waveform, a quantization circuit 2 for quantizing the amplitude of the PAM pulse into $2^7(=128)$ through $2^8(=256)$ steps in accordance with a predetermined rule, and a coding circuit (PCM pulse coding) 3 for altering each step by a combination of presence or absence of 7 bits (or 8 bits) of unit pulses, or 7 through 8 digits binary code. The above circuit configuration is identical to the conventional circuit as shown in FIG. 7.

The invention further comprises a shuffling circuit network 7 to shuffle the PCM signal as weighted by the coding circuit 3 using the "lottery" technique, thereby making the weighting random. The PCM signal randomly weighted by the shuffling circuit network 7 is transmitted to the receiving end through the transmission path 4.

Figure 2:
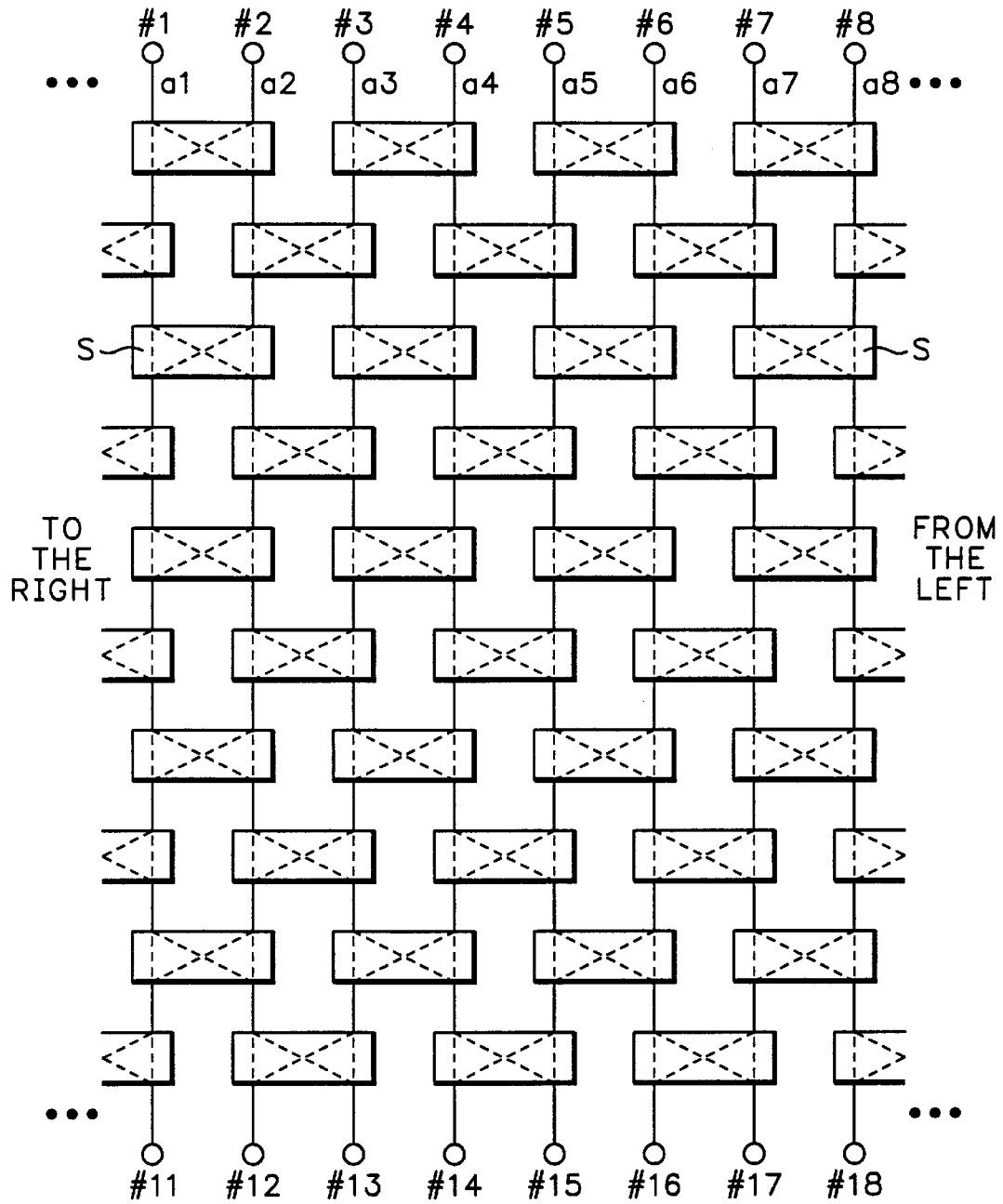
FIG. 2 is a circuit schematic of the shuffling/de-shuffling network to be used in the system in FIG. 1.
Figure 3:
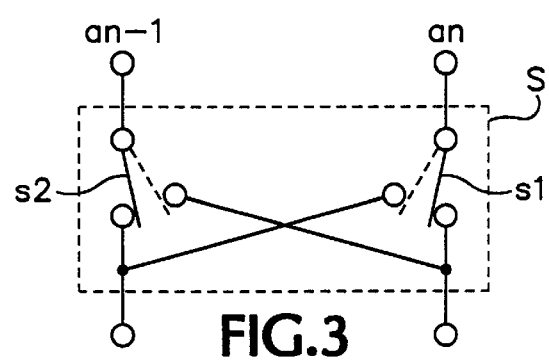
FIG. 3 is a circuit schematic of a switching circuit to be used in the circuit network in FIG. 2.

The shuffling circuit network 7 for randomly weighting the PCM signal weighted by the coding circuit 3 in accordance with the "lottery" technique comprises, as shown in FIG. 2, 8 input terminals #1 through #8 to which a PCM signal of, for example, 8 bits digital data (left extreme is MSB and right extreme is LSB) is applied, 8 output terminals #11 through #18 from which a PCM signal of shuffled 8 bits digital is derived, 8 transmission lines $a_1$ through $a_8$ connected respectively between the input terminals #1 through #8 and the output terminals #11 through #18, a plurality of switching circuits S for cross connecting or non-cross connecting between adjacent transmission lines, and a control circuit P for controlling the switching circuits S.

Each switching circuit S may be identical and comprises two ganged switches $S_1$ and $S_2$ connected to adjacent transmission lines a(n−1), an. When switches $S_1$, $S_2$ are in the condition as shown by the solid line, the switching circuit S is non-cross connected thereby causing no effect between the 2 transmission lines a(n−1), an.

On the other hand, when the ganged switches $S_1$, $S_2$ are in the condition shown by the dotted line, the adjacent transmission lines a(n−1), an are cross connected and interchanged to each other.

The control circuit P controls the selected switching circuits S in the shuffling circuit network 7 for cross connecting two transmission lines. The 8 bits digital data applied to the input terminals #1 through #8 is shuffled before being derived from the output terminals.

Figure 4:
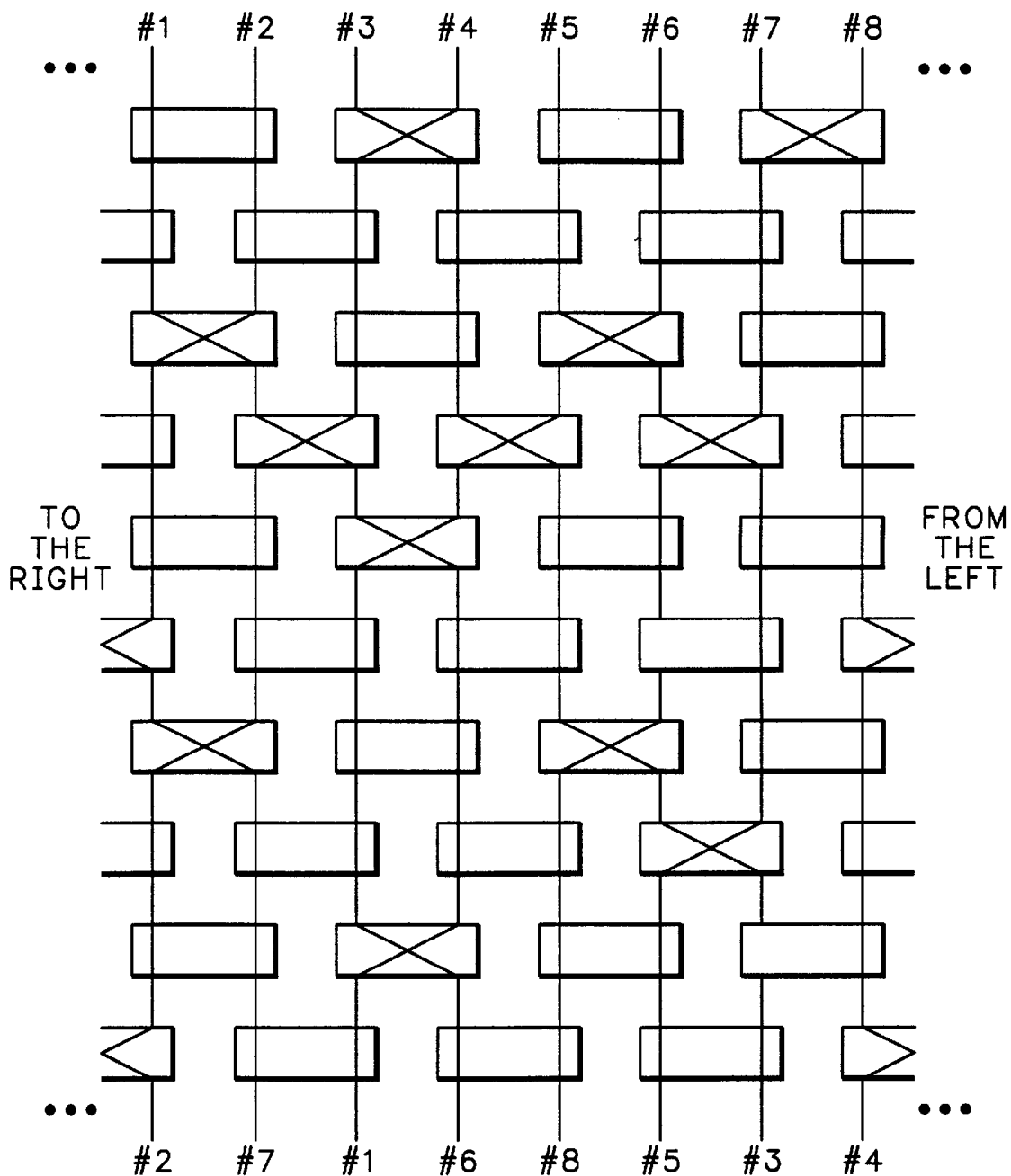
FIG. 4 shows how shuffling of 8 bits digital data is performed using the "lottery" technique.

When a plurality of switching circuits are switched as shown, for example, in FIG. 4, the digital data (#1 through #8) applied to the 8 input terminals are shuffled in such a manner to provide the shuffle digital data (#2, #7, #1, #6, #8, #5, #3, #4) from the output terminals.

On the other hand, reverse operations as the transmission end are performed at the receiving end for de-shuffling. Such de-shuffling operation is performed by using a de-shuffling circuit network 8 which is the same as the shuffling circuit network 7 at the transmission end. However, the input and output terminals are reversed. The shuffled digital data is applied to the circuit network at the output side and the digital data is derived from the input side, thereby de-shuffling to obtain the original digital data.

In other words, the same circuit network is used with the switching conditions of the switching circuits S opposite to each other between the input and output (vertically symmetrical in the shown condition) by controlling the switching circuit S, thereby reproducing the original digital data. Now, the reproduced digital data is decoded by a decoder circuit 5 and quantization noise is removed by a filter circuit 6 as shown in FIG. 1.

Switching operation procedures of the switching circuits S by the control circuit P are predetermined at both transmission and receiving ends, thereby achieving confidential communications between both ends.

If the shuffling operation by the control circuit P remains unchanged over a length of time, a third party may understand the secret. In order to avoid having this occur, the shuffling operation of the circuit network may be modified after transmitting a predetermined amount of data or at every constant time, thereby making it more difficult for a third party to understand the particular shuffling operation.

(Alternative Embodiment)

In the switching circuits S in the shuffling/de-shuffling circuit networks, the switches may comprise semiconductor switching circuits using both p-channel and n-channel MOSFETs (metal oxide semiconductor field effect transistors).

Figure 5:
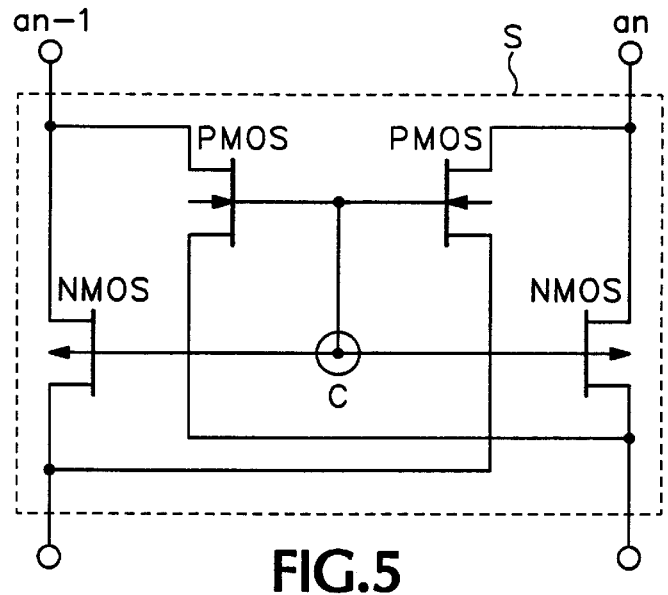
FIG. 5 is a circuit schematic of an integrated circuit form of the switching circuit in the circuit network as shown in FIG. 2.

As illustrated in FIG. 5, source-drain electrodes of a pair of n-channel MOSFETs are interposed in two transmission lines a n−1), an in a non-crossing manner while source-drain electrodes of a pair of p-channel MOSFETs are interposed in two transmission lines a(n−1), an in a crossing manner. Gate electrodes of the 4 MOSFETs are commonly coupled (C) to which positive or negative voltage from the control circuit P is applied for selectively cross connecting or non-cross connecting two transmission lines a(n−1), an.

Although adjacent two transmission lines are cross connected or non-cross connected in the shuffling/de-shuffling circuit network in FIG. 2, it is to be understood that remote transmission lines may be cross connected or non-cross connected.

A plurality of transmission lines in the shuffling/de-shuffling circuit networks may be disposed in a planar manner or both ends may be brought close to each other so that the plurality of transmission lines look like a basket.

Additionally, an invertor may be inserted in a part of the transmission lines for inverting the digital signal therethrough in order to make the shuffling/de-shuffling operation more complicated.

Also, a similar operation may be performed by using computer software rather than the shuffling/de-shuffling circuit network.

Although the foregoing embodiments are described with regard to the shuffling/de-shuffling operation of PCM signals as an example, it is to be understood that the present invention can be applied to words and characters used in general coding system other than PCM signals. Such data may be handled as a parallel data to apply the present invention.

(Advantage of the Invention)

As understood from the above descriptions about embodiments of the present invention, the shuffling/de-shuffling system according to the present invention using the "lottery" technique, the digital data is hardly understood by a third party, thereby effectively maintaining high degree of confidentiality in the communication digital data.

While plural embodiments of the present invention have been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. A digital data encryption system, comprising:

means to generate plural bits of digital data to be transmitted;

a circuit network having a plurality of input terminals equal to the number of said bits, a plurality of output terminals equal to the number of said bits, and a plurality of switching circuits for cross connecting or non-cross connecting between two lines out of a plurality of transmission lines interconnecting said input terminals and said output terminals; and a control circuit for controlling said plurality of switching circuits;

wherein said control circuit is controlled for encrypting the data applied to said input terminals before being transmitted to said output terminals by selectively activating ones of said plurality of switching circuits for cross connecting or non-cross connecting between selected ones of two lines of said plurality of transmission lines.

2. A digital data decryption system for decrypting encrypted digital data, comprising:

a circuit network having a plurality of input terminals equal to a number of bits of the encrypted digital data, and a plurality of output terminals equal to the number of bits of the digital data, and a plurality of switching circuits for selectively cross connecting or non-cross connecting between two lines out of a plurality of transmission lines from said input terminals to said output terminals; and a control circuit for controlling said plurality of switching circuits;

wherein said control circuit controls said switching circuits to output an original digital data from said output terminals by selectively activating ones of said plurality of switching circuits for cross connecting or non-cross connecting between selected ones of two lines of said plurality of transmission lines thereby decrypting data applied to said input terminals.

* * * * *